UNITED STATES PATENT OFFICE.

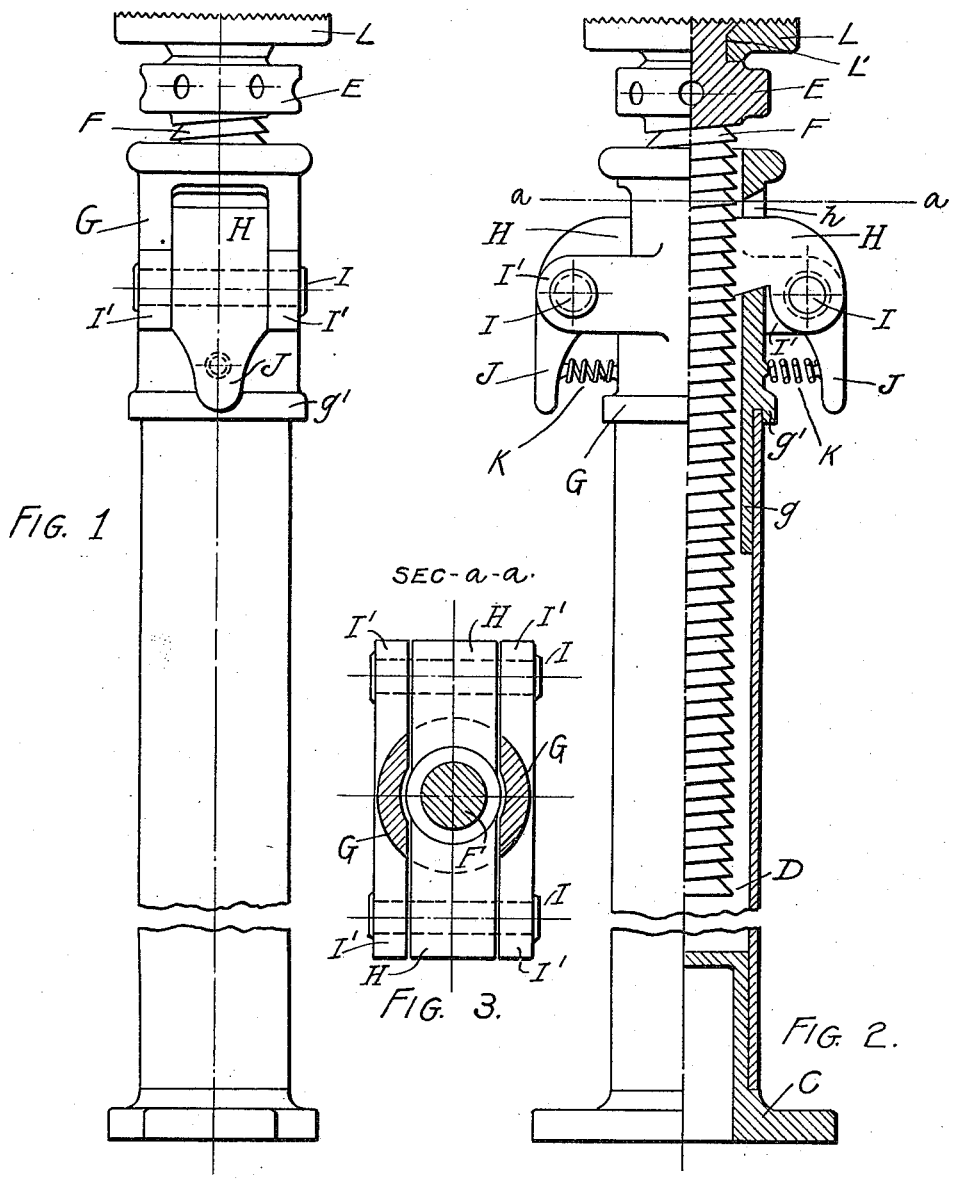

ADAM H. CLAYMIER, OF LAKE, WISCONSIN.

TRENCH-JACK.

1,132,763.

Specification of Letters Patent.

Patented Mar. 23, 1915.

Application filed January 27, 1913. Serial No. 744,381.

*To all whom it may concern:*

Be it known that I, ADAM H. CLAYMIER, a citizen of the United States, residing at the town of Lake, county of Milwaukee, and State of Wisconsin, have invented new and useful Improvements in Trench-Jacks, of which the following is a specification.

My invention relates to that class of devices which are used for holding the curbing in position along the walls of ditches, sewer trenches and the like, or in wells or other excavations.

The object of my invention is to provide a form of jack for the above stated uses, which can be quickly adjusted in a supporting position and subsequently extended to apply a forcible pressure to the walls to be supported, and which cannot be accidentally dislodged, it being regarded as extremely important that a jack of this kind should be absolutely reliable for the reason that fatalities may result in case of a failure of the jack to provide the expected support for the walls.

In the drawings—Figure 1 is an elevation of a jack embodying my invention. Fig. 2 is an elevation of the same, part in longitudinal section, and viewed at right angles to Fig. 1. Fig. 3 is a cross sectional view, drawn on line a—a of Fig. 2.

Like parts are identified by the same reference characters throughout the several views.

A tubular spacing member D is provided with an end cap C which is shouldered to receive the end of the tube D, as shown. This cap C constitutes a head piece in slip joint connection with the tube D. At the other end of the tube D, a fitting G is employed which is provided with a sleeve flange g adapted to enter the end of the tube D and a capping flange g' fitting over this end of the tube and bearing upon its exterior surface, thus forming a slip joint connection between the fitting and the tube D, the latter constituting a hollow spacing member. The fitting G is provided with slots h through which levers J which support nut segments H may pass. The levers J are pivoted at I to outwardly projecting ears I', formed on the exterior wall of the fitting G. The levers J may be oscillated upon the pivot pins or fulcrums I to move the nut segments inwardly or outwardly into and out of engagement with the screw F hereinafter described. Compressing springs K are interposed between the outer ends of the levers J and the wall of the fitting G, whereby these ends of said levers are normally pressed outwardly to push the nut segments inwardly with reference to the slots h.

A bearing head piece L is swiveled at L' upon a screw threaded adjusting bolt F, said bolt being also provided with a nut E preferably adapted to receive a spanner wrench. The threaded portion of the bolt F is adapted to pass through the tubular fitting G to the interior of the tube D, and the nut segments H are threaded to engage the threads on the bolt F. Said bolt threads are slightly undercut in the direction of the head L, whereby pressure applied to the head, when the nut segments are engaged with the bolt threads, will cause said nut segments to rigidly grip the bolt.

In operation, assuming that the device is to be used in a ditch or sewer trench, the cap C is placed against one wall or curb, and the outer arms of levers J are pushed inwardly, said arms being so positioned that they can be both simultaneously grasped in one hand by the operator. When the levers J are thus pushed inwardly, the nut segments H are retracted from the bolt F. Said bolt F may then be pulled out until the head piece L strikes the opposite wall of the trench or curbing. The levers J are then released and the wrench applied to the nut E, rotating the bolt in the direction to feed it outwardly in the nut segments H until the desired pressure against the curb walls engaged by the caps C and head L, is secured. As the pressure increases, the nut segments H are securely gripped by the engaging bolt threads, owing to the inclination of the undercut sides of the threads. It then becomes impossible to release the nut segments by pressing the lever arms J inwardly, and the jack will therefore remain in position and cannot be dislodged by accident. Even a violent blow upon one or both of the outer arms of levers J will not cause a release of the bolt from the nut segments. When it is desired to remove the jack, the wrench is again applied to the nut E to rotate bolt F in the opposite direction until the longitudinal pressure is relieved, whereupon the outer arms of levers J may be moved inwardly to permit of a free adjustment of the bolt F to any desired position. By having nut segments which are retractable, it is possible to extend the jack to any desired length without loss of time, and therefore, in case any weakness appears at any portion of the curbing, a jack may be instantly applied and adjusted in position.

The end cap C and swiveled head piece L constitute bearing plates, and these will of course be made large enough to cover the desired area upon the surfaces of the curbing to which they are applied. The levers J are preferably parallel to the sides of the fitting G for convenience in actuating these levers and also to avoid objectionable laterally projecting arms or spurs. The fitting G is formed independently of the tube D for the reason that the fitting G can most conveniently be formed as a casting, and this can be used with tubes D of any desired length, or with tubes D of different lengths, whereby the same apparatus may be employed for trenches of different widths by merely interchanging tubes D of different lengths.

I claim—

1. A trench jack, including the combination with a jack screw, of a tubular fitting adapted to receive said screw, and provided with a set of outwardly projecting ears, a set of elbowed levers pivoted to said ears each with one arm projecting inwardly and adapted to bear upon the fitting, and provided at its extremity with a screw engaging nut segment, and springs interposed between the other ends of said levers and the fitting, said fitting having sufficient thickness and strength to support the inwardly projecting arms of the elbowed levers in close proximity to the screw whereby strain upon the pivotal connection of said levers to the ears is almost wholly relieved.

2. A sewer trench jack, comprising the combination with head pieces, each adapted to bear upon the curbing of a trench, of a hollow spacing member having one end in slip joint connection with one head piece, a fitting in slip joint connection with the other end of said spacing member and provided with slots in opposite sides thereof, a screw having swivel connection with the other head piece and adapted to slide loosely in said fitting and spacing member, and a set of spring actuated levers pivoted to the fitting and projecting through the slots therein, the inner ends of said levers being threaded and constituting nut segments, adapted to engage the screw, substantially as described.

In testimony whereof I affix my signature in the presence of two witnesses.

ADAM H. CLAYMIER.

Witnesses:
LEVERETT C. WHEELER,
H. C. VAN RYN.